United States Patent
Johns

[15] 3,656,344
[45] Apr. 18, 1972

[54] LOGGING RADIAL TEMPERATURE DISTRIBUTION WITHIN A WALL

[72] Inventor: Earl Johns, Fort Worth, Tex.
[73] Assignee: Gearhart-Owen Industries, Inc., Fort Worth, Tex.
[22] Filed: Nov. 20, 1970
[21] Appl. No.: 91,294

[52] U.S. Cl. ........................ 73/154, 33/205.5 E, 73/343.5
[51] Int. Cl. ............................ E21b 47/024, E21b 47/06
[58] Field of Search .................. 73/154, 152, 340, 341, 342, 73/343.5; 166/64; 33/205

[56] References Cited

UNITED STATES PATENTS

| | | | |
|---|---|---|---|
| 3,186,481 | 6/1965 | Foster | 73/152 UX |
| 3,363,457 | 1/1968 | Ruehle | 73/154 |

Primary Examiner—Jerry W. Myracle
Attorney—Wofford & Felsman

[57] ABSTRACT

Method of and apparatus for logging temperature in a well bore penetrating subterranean formations characterized by rotating a directional temperature sensor radially about the longitudinal axis of a temperature logging tool traversing the well bore; and displaying and recording a function representative of the temperature distribution sensed by the temperature sensor as it is rotated radially. Also disclosed are specific and preferred embodiments in which a direction indicating means is incorporated into the system to indicate the direction of anomalies sensed by the temperature sensor; the function is differentiated to produce a differential function of increased sensitivity which is also displayed; and the logging tool is simultaneously traversed while the temperature sensor is being rotated to effect a log of a greater interval of the well bore.

21 Claims, 7 Drawing Figures

INVENTOR
Earl Johns
BY
Wofford & Felsman
ATTORNEYS

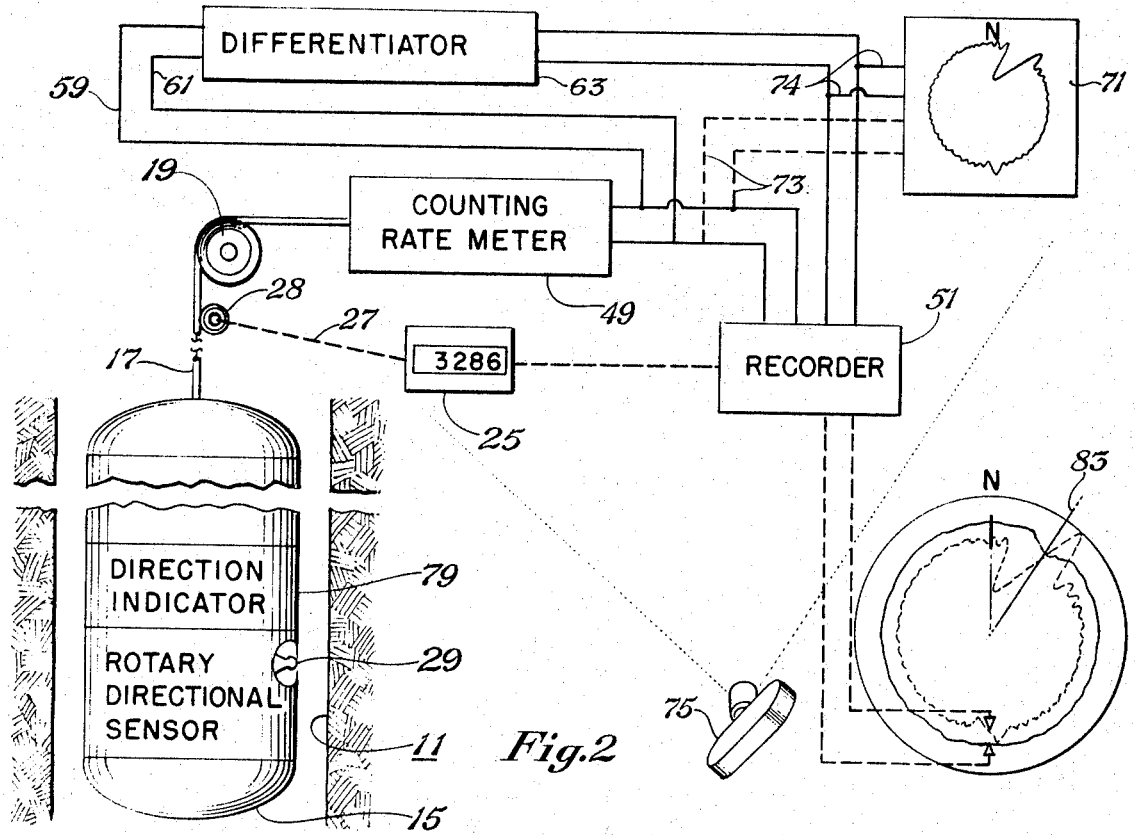
Fig.2
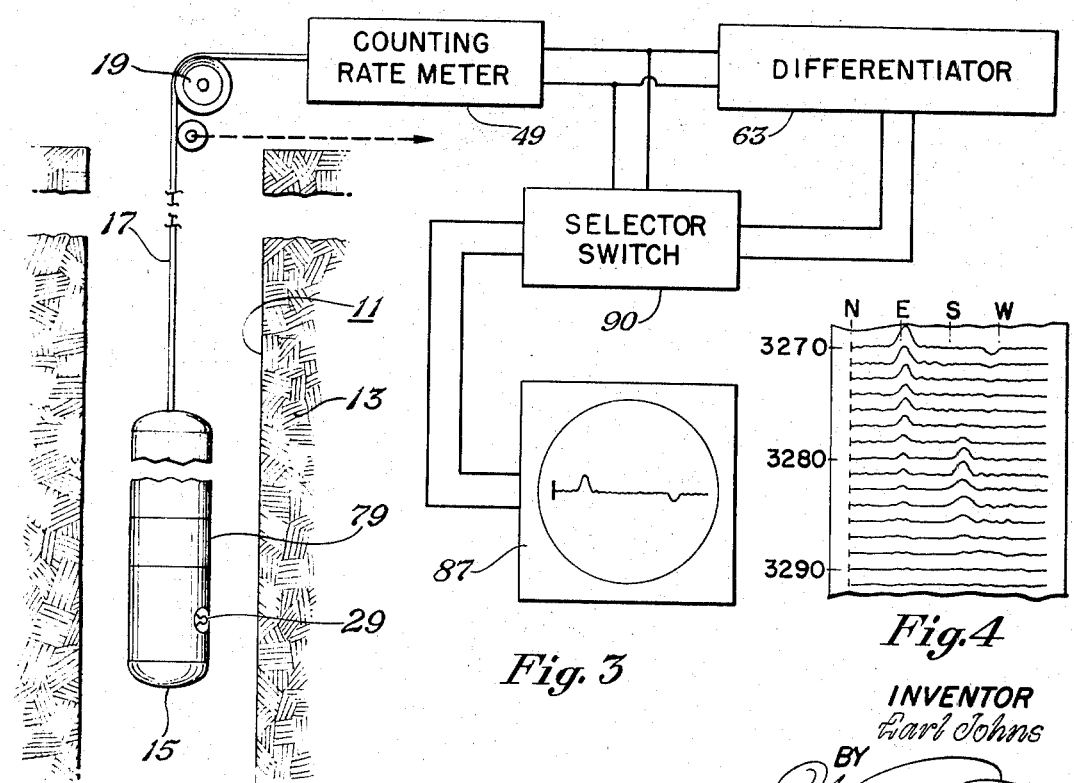
Fig.3
Fig.4

LOGGING RADIAL TEMPERATURE DISTRIBUTION WITHIN A WALL

BACKGROUND OF THE INVENTION

1. Field of the Invention

This invention relates to the measurement of temperature in a well bore penetrating subterranean formations. More particularly, it relates to method and apparatus for logging the radial temperature distribution in a well bore penetrating subterranean formations for delineating via temperature anomailes directional structural inhomogeneities and anisotropies of the subterranean strata.

2. Description of the Prior Art

Logging of temperatures in well bores penetrating subterranean formations has long been employed and has reached a fine state of development culminating in patents such as U.S. Pat. No. 3,410,136 entitled "Differential Temperature Well Logging Apparatus," issued Nov. 12, 1968 to Earl Johns and Gerald Max Lowrie; and U.S. Pat. No. 3,494,186 entitled "Method and Apparatus for Obtaining Differential Logs, Especially of Down-Hole Well Bore Variables," issued Feb. 10, 1970 to Earl Johns and Gerald Max Lowrie. While such temperature logging has proven to be advantageous, the full potential of temperature logging has not yet been realized, in that directional structural inhomogeneities; such as, vertical fractures; were not delineated with particularity.

BRIEF DESCRIPTION OF THE DRAWINGS

FIG. 2 is a diagrammatic representation of another embodiment of this invention in which a temperature logging tool employs a direction indicator to correlate anomalies with respect to direction.

FIG. 3 is a diagrammatic representation of another embodiment of this invention employing a temperature logging tool that is being traversed along the longitudinal axis of the well bore and indications representative of radial temperature distribution for successive single revolutions of the temperature sensor means are displayed.

FIG. 4 is a diagrammatic representation of a record made by recording with respect to depth the displays of FIG. 3.

DESCRIPTION OF THE PREFERRED EMBODIMENTS

It is an object of this invention to provide method of and apparatus for logging a well bore penetrating subterranean formations that will effect a radial temperature distribution display and thereby delineate, via anomalies in the radial temperature distribution, structural inhomogeneities and anisotropies in a particular direction from the center along the well bore.

It is a particular object of this invention to provide method and apparatus that may be employed to log a single radial temperature distribution at a plane at a given depth in the well or effect a log or radial temperature distributions as a temperature logging tool traverses the longitudinal axis of the well bore and to display the radial temperature distribution in a form that is meaningful to the observer at the surface.

As discussed in detail in the aforementioned U.S. Pat. No. 3,410,136, anomalies in the departure of temperature from the normal geothermal gradient afford useful information as to strata that appear to be taking or producing fluids. When the fluid within a well is static, and has been static for a long time, the radial temperature distribution, if displayed with magnitude along radials from a reference point, will form a circle. If, however, fluid at a temperature different from the temperature at the face of the formation at the well bore, is flowed, either into or from the formation, permeability inhomogeneities will cause small variations in temperature where the major part of the fluid flows. Delineation of these permeability inhomogeneities is valuable.

Small anomalies in temperature sensed by a temperature sensor often may not be visible to the observer when presented as absolute values. By presenting a plot of the differences in temperature between two successive points separated by a selected interval or spacing on the locus of sensor travel, these small anomalies can be made readily apparent. Such differential plot may be derived from two discrete temperature sensors separated by a predetermined spacing, or it may be derived from a single temperature sensor. When a single sensor is used, the differential value may be obtained either by the storage method, exemplified by the disclosure of above-mentioned U.S. Pat. No. 3,410,136 or by the substantially instantaneous differentiation method exemplified by above-mentioned U.S. Pat. No. 3,494,186.

Figure 1:
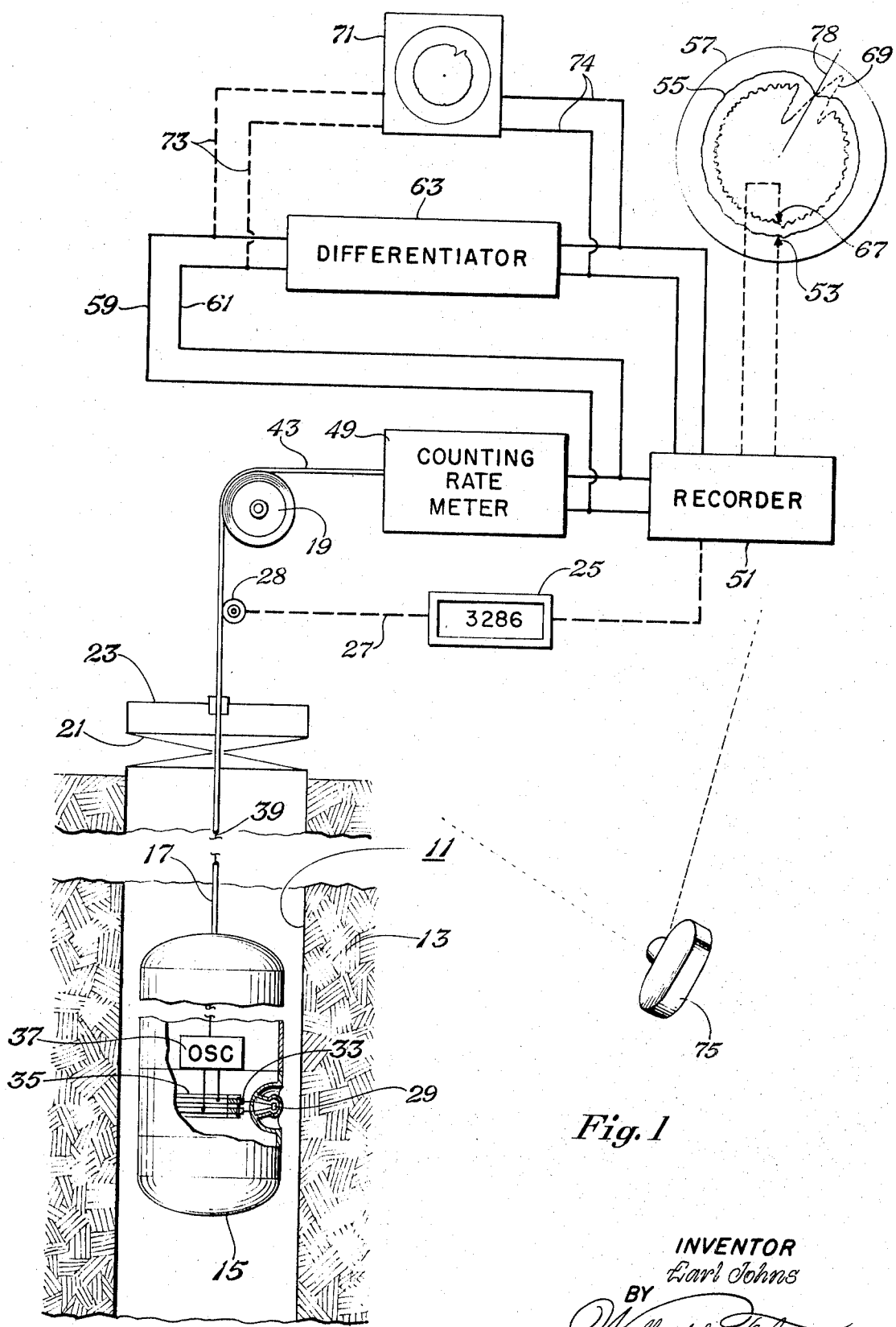
FIG. 1 is a diagrammatic representation of apparatus embodying this invention being employed to log radial temperature distribution on a radial plane in a well.

Referring to FIG. 1, a well bore 11 penetrates subterranean formations 13. A temperature logging tool 15 is suspended via a traversing means for being moved along the longitudinal axis of well 11. Specifically, temperature logging tool 15 is suspended from a cable 17, and the cable 17 is wound about a hoisting drum 19. Suitable well head equipment such as valves 21 and lubricator 23 are employed for insertion of the temperature logging tool 15 under pressure conditions at the well head. A depth measuring means 25 is employed to measure the depth at which the temperature logging tool 15 is suspended in the well bore 11. Measuring means 25 may be mechanically connected as indicated by dashed lines 27, with a measuring wheel 28 engaging cable 17.

In the temperature logging tool 15, a temperature sensor 29 is mounted for sensing temperature at an azimuth on a radial from the center of the tool 15. A means such as a motor (not shown) is employed for rotating the temperature sensor. The temperature sensor 29 is electrically connected via brushes 33 and slip rings 35 with an oscillator 37 (OSC). The temperature sensor 29 is of the resistance type such as a thermistor; and oscillator 37 is of the resistance controlled pulse type such as the unijunction relaxation type.

The output from oscillator 37, is connected via conductor 39, brushes in hoisting drum 19, and conductor 43 with counting rate meter 49. The counting rate meter 49 is connected with one channel of recorder 51 (operating stylus 53) to record the absolute value of the temperature, denoted by line 55 on polar chart 57. As illustrated, line 55 is a generally circular line in which the magnitude of the temperature is displayed along radials emanating from the center of the polar chart 57.

The counting rate meter 49 is also connected via conductors 59 and 61 with differentiator 63. The differentiator 63 differentiates the output signal from the counting rate meter 49 to provide a differential signal. The differentiator 63 is connected with another channel of recorder 51 for effecting (via stylus 67) a recording of the differential temperature value, indicated by line 69. As can be seen from comparing the absolute value 55 with the differential value 69, a small anomaly in the absolute value appears as a much greater anomaly in the differential value, and an anomaly is apparent on the differential plot that does not appear on the absolute plot. The output of the counting rate meter, or the output of the differentiator can be visually monitored when desired by means of an oscilloscope 71 which is connected by suitable conductor means 73, 74 to receive such outputs.

In operation of the embodiment of FIG. 1, temperature logging tool 15 is lowered into the well through appropriate lubricator 23 and valves 21. The temperature logging tool 15 is lowered to the desired depth. Frequently the depth will be at a point where a suspected permeability inhomogeneity or other directional characteristic of the subterranean stratum is to be investigated.

Once the desired depth has been reached, the radial temperature distribution is monitored and if desired, recorded. In addition, either or both the absolute value and the differentiated value may be displayed in the well known plan position indicator (PPI) fashion on oscilloscope 71. A record may be made of the face of the oscilloscope 71 and of depth measuring means 25, as by appropriate camera 75. In the record made on polar chart 57, the radial temperature distribution indicates a cool anomaly along radial 78. Note that on the log 55 the slight lowering of absolute temperature is barely preceptible, whereas it is clearly apparent on the log 69 of the differential temperature.

If desired, the logging tool may be lowered to a deeper depth, or raised to a lesser depth and another radial temperature distribution record, or log, made. The respective charts may be marked with the appropriate depth either manually or by an automatic device, indicated by dashed line 77 extending from the depth measuring means to the recorder.

The delineation of the fact that a directional anisotropy exists is valuable information. Frequently, however, the usefulness of the information may be improved by correlating the anisotropy with direction. An embodiment of the invention in which the temperature logging tool incorporates a direction indicating means such as direction indicator 79, FIG. 2, will effect such correlation. The direction indicator 79 may be a gyroscope which is oriented at the surface and that maintains, via suitable gimbal mounting rings, its directional orientation throughout the traverse of the temperature logging tool into and out of the well bore 11. On the other hand, it may be a suitable compass such as a flux gate compass that is allowed to orient itself with respect to the earth's magnetic field. Both types of direction indicators and their use with down-hole logging tools are known. In FIG. 2 the same general components are employed to effect the same general approach to logging as in the FIG. 1 embodiment. The points of difference, however, are that the direction indicator 79 imposes a DC shift, shown at 81 on chart 57, to indicate a given direction such as north (N). The interconnection of the respective elements and the operation of the logging tool 15 are generally as outlined with respect to FIG. 1. As can be seen along radial 83 there is a slight decrease in the absolute temperature and an exaggerated anomaly in the differential temperature about 45° with respect to 81.

As indicated, 81 represents a DC voltage level shift effected by contact of a terminal on the rotary temperature sensor with terminal located at north in the direction indicator 79. As indicated with respect to FIG. 1, the temperature logging tool 15 may be raised or lowered and another radial temperature distribution log made to delineate anomalies with respect to direction at the new depth in the well bore.

Figure 5:
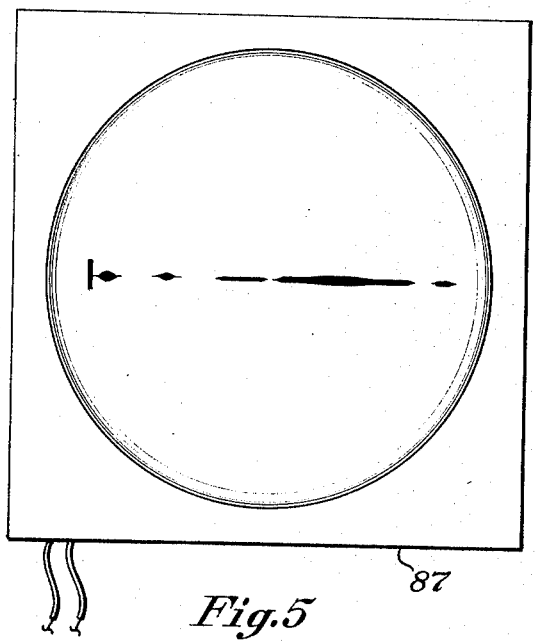
FIG. 5 is a diagrammatic representation of another type of display that could be utilized instead of the one shown by FIG. 3.
Figure 6:
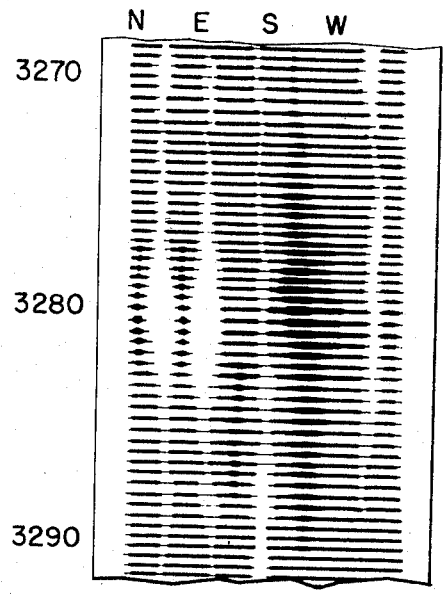
FIG. 6 is a diagrammatic representation of a record made by recording with respect to depth the displays of FIG. 5.
Figure 7:
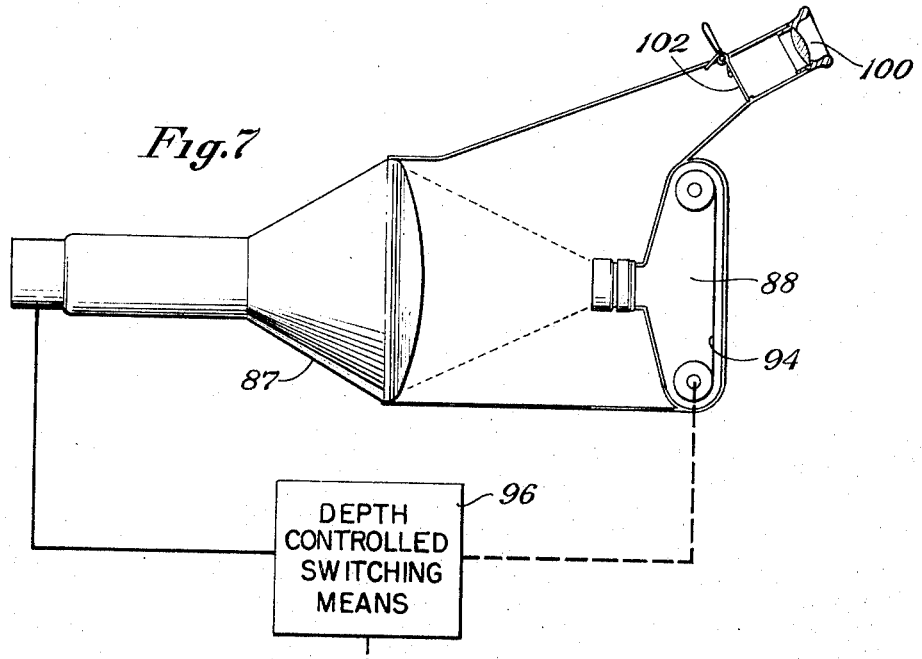
FIG. 7 is a diagrammatic showing of the recording means utilized to make records such as those shown by FIGS. 4 and 6.

A further embodiment in which the well logging tool 15 is traversed along the longitudinal axis of the well while the temperature sensor 29 is simultaneously rotated about the longitudinal axis of the temperature logging tool 15 is illustrated in FIGS. 3 through 7. In this embodiment (see FIG. 7), an oscilloscope 87 is fitted with an oscilloscope camera 88 wherein no shutter is employed and the film 94 is advanced continuously as a function of depth. Eyepiece means 100 is provided for viewing the oscilloscope face. A manually operable closure 102 prevents entry of light when the eyepiece means is not in use. Each horizontal sweep presented on the face of the oscilloscope is triggered by a terminal on the rotating assembly containing the temperature sensor 29 coming in contact with a second terminal which could be merely a terminal at a reference point on the circumference of the tool or preferably on a direction indicator 79 in the temperature logging tool 15. In this way it becomes possible to orient the sweeps with respect to a given reference such as north on the face of the oscilloscope. Such horizontal sweep is time based with a period substantially equal to the period of rotation of the sensor. This arrangement provides a sweep that can progress along a linear scale from a point representing north, through points representing intermediate directions and back to north. The outputs of counting rate meter 49 and differentiator 63 are connected via a selector switch 90 to an input of oscilloscope 87. Thus, either the absolute or differential temperature value can be selected for display and the displays and presentations shown in FIGS. 3 and 5 are typical of either. Of course, if desired, both absolute and differential temperature values could be displayed and presented simultaneously by utilizing two oscilloscopes and two cameras.

The display shown in FIG. 3 is derived by applying the selected output to the vertical or Y input of the oscilloscope. Since the horizontal sweep of the oscilloscope is time based as above-mentioned, this may be appropriately designated as a YT display. This YT display is not made with each revolution of the sensor. Rather, depth controlled switching means 96 is provided that operates at each of preselected depth intervals. Each operation enables the horizontal sweep, allowing it to be initiated when the next following reference signal arrives from the down-hole tool. On completion of this single sweep, the horizontal sweep is inhibited until the next operation of the depth controlled switching means. Thus, a single display occurs for each depth interval and each display is successively recorded on the moving film 94 resulting in a presentation exemplified by FIG. 4.

If desired, the display shown by FIG. 5 may be utilized. This display is derived by applying the selected output to intensity or Z input of the oscilloscope. Since the horizontal sweep of the oscilloscope is time based, this may be appropriately designated as a ZT display. This ZT display is made with each revolution of the sensor, the horizontal sweep being triggered by every reference signal arriving from down-hole, and each display is successively recorded on the moving film 94 resulting in a presentation exemplified by FIG. 6.

The film 94 showing the anomalies sensed by the down-hole tool and the depth at which the anomalies occurred may be reviewed by a petroleum engineer or a geologist to determine the remedial measures that are advisable.

The measurement of the temperature has been described with respect to employing a thermistor and a pulse oscillator in the well logging tool and integrating the pulses in surface equipment. If desired, the sensor resistance may be measured directly. Any of the well known means of transmitting down-hole data or information to the surface may be employed to effect transmission of the temperature information to surface measuring equipment.

A particular use of the direction indicating means in which a voltage shift is employed has been described. Any of the direction indicating means and their signals such as employed heretofore in dip meters, may be employed in this invention. In general, a wide variety of well known apparatus for logging down-hole parameters are available and may be adapted to transmitting the radial temperature distribution information to the surface. Moreover, a wide variety of surface display and recording apparatus is available to preserve the information so displayed or recorded.

The preferred embodiment employing resistance type temperature sensors has been described hereinbefore. Any type temperature sensor having the requisite sensitivity, can be employed.

From the foregoing descriptive matter in conjunction with the drawings, it can be seen that this invention provides a method of logging a well to obtain radial temperature distribution for delineating anisotropies or inhomogeneities in the subterranean formations about the periphery of the well bore. Moreover, it can be seen that this invention may be employed to produce logs of a planar temperature distribution or a series of radial temperature distribution patterns along the longitudinal axis of the well bore as the temperature logging tool is traversed along the longitudinal axis of the well bore. In any event, this invention overcomes the disadvantages of the prior art, wherein the radial temperature measurements were made utilizing a number of sensors disposed at discrete spaced intervals about the circumference of a downhole tool.

Although the invention has been described with a certain degree of particularity, it is understood that the present disclo-

What is claimed is:

1. A method of logging temperature is a well penetrating subterranean formations comprising the steps of:
   a. lowering a temperature logging tool to a depth in said well;
   b. rotating temperature sensor means radially about the circumference of said temperature logging tool and the longitudinal axis of said well; and
   c. displaying at the surface a function representative of the radial temperature distribution sensed by said temperature sensor means being rotated radially about said tool.

2. The method of claim 1 wherein there is additionally displayed an indication of the radial position of the sensor means relative to a reference point on the tool circumference.

3. The method of claim 2 wherein said reference point is established by direction indicator means.

4. A method of logging temperature in a well penetrating subterranean formations comprising the steps of:
   a. lowering a temperature logging tool to a depth in said well;
   b. rotating temperature sensor means radially about the circumference of said temperature logging tool and the longitudinal axis of said well; and
   c. recording with respect to depth a function representative of the radial temperature distribution sensed by said temperature sensor means being rotated radially about said tool.

5. The method of claim 4 wherein there is additionally recorded an indication of the radial position of the sensor means relative to a reference point on the tool circumference.

6. The method of claim 5 wherein said reference point is established by direction indicator means.

7. A method of logging temperature in a well penetrating subterranean formations comprising the steps of:
   a. traversing a temperature logging tool along the longitudinal axis of said well and simultaneously rotating temperature sensor means radially about the circumference of said temperature logging tool and the longitudinal axis of said well;
   b. displaying at the surface, a function representative of the temperature distribution sensed by said temperature sensor means being rotated radially about said tool as said tool is traversed along said longitudinal axis of said well.

8. The method of claim 7 wherein there is additionally displayed an indication of the radial position of the sensor means relative to a reference point on the tool circumference.

9. The method of claim 8 wherein said reference point is established by direction indicator means.

10. A method of logging temperature in a well penetrating subterranean formations comprising the steps of:
    a. traversing a temperature logging tool along the longitudinal axis of said well and simultaneously rotating temperature sensor means radially about the circumference of said temperature logging tool and the longitudinal axis of said well; and recording with respect to depth at the surface, a function representative of the temperature distribution sensed by said temperature sensor means being rotated radially about said tool as said tool is traversed along said longitudinal axis of said well.

11. The method of claim 10 wherein there is additionally recorded an indication of the radial position of the sensor means relative to a reference point on the tool circumference.

12. The method of claim 11 wherein said reference point is established by direction indicator means.

13. In apparatus for logging temperature in a well penetrating subterranean formations including:
    a. means for lowering a tool to a depth within said well under well conditions;
    b. depth measuring means connected with said lowering means and operable to measure the depth of said tool in said well; and
    c. surface equipment including oscilloscope means for effecting a display; the improvement comprising:
    d. temperature logging tool connected with said lowering means and adapted for being lowered into said well; said temperature logging tool including:
       i. a temperature sensor mounted for sensing temperature at an azimuth from the center of said tool and for rotation through a plurality of said azimuths;
       ii. means for rotating said temperature sensor about the circumference of said tool and the longitudinal axis of said well so as to sense the radial temperature distribution at said depth;
    e. function generating means connected with said temperature sensor for generating a function representative of the temperature sensed by said temperature sensor;
    f. means connecting said function generating means with said oscilloscope.

14. The apparatus of claim 13 wherein said temperature logging tool includes reference indicating means, and said oscilloscope means is also connected with said reference indicator means such that anomalies on the display produced by said oscilloscope means will be displayed with respect to a reference point on the tool circumference.

15. The apparatus of claim 14 wherein said reference indicator means is a direction indicator means such that said reference point is established by the direction indicator means.

16. In apparatus for logging temperature in a well penetrating subterranean formations including:
    a. means for lowering a tool to a depth within said well under well conditions;
    b. depth measuring means connected with said lowering means and operable to measure the depth of said tool in said well; and
    c. surface equipment including a recorder means for effecting a record; the improvement comprising:
    d. temperature logging tool connected with said lowering means and adapted for being lowered into said well; said temperature logging tool including:
       i. a temperature sensor mounted for sensing temperature at an azimuth from the center of said tool and for rotation through a plurality of said azimuths;
       ii. means for rotating said temperature sensor about the circumference of said tool and the longitudinal axis of said well so as to sense the radial temperature distribution at said depth;
    e. function generating means connected with said temperature sensor for generating a function representative of the temperature sensed by said temperature sensor;
    f. means connecting said function generating means with said recorder means.

17. The apparatus of claim 16 wherein said temperature logging tool includes reference indicating means, and said recorder means is also connected with said reference indicator means such that anomalies on the record produced by said recorder means will be displayed with respect to direction.

18. The apparatus of claim 17 wherein said reference indicator means is a direction indicator means such that said reference point is established by the direction indicator means.

19. Apparatus for logging temperature in a well penetrating subterranean formations comprising:
    a. traversing means for traversing a temperature logging tool along the longitudinal axis of said well;
    b. depth measuring means and depth display means connected with said traversing means and operable to display the depth of a tool in said well;
    c. a temperature logging tool connected with said traversing means; said temperature logging tool including:

i. a temperature sensor mounted for sensing temperature at an azimuth on a radial from the center of said tool and for rotation through a plurality of said azimuths;
ii. means for rotating said temperature sensor about the circumference of said tool and the longitudinal axis of said well so as to sense the radial temperature distribution as said tool is traversed along said well; and
iii. reference indicating means;
d. function generating means connected with said temperature sensor for generating a function representative of the temperature sensed by said temperature sensor:
e. display means connected with said function generator and responsive to said reference indicator means so as to trigger a sweep when said temperature sensor is rotated past a predetermined reference point located on the circumference of said tool; and
f. means for recording successive displays with respect to depth.

20. The apparatus of claim 19 wherein said reference indicator means is a direction indicator means such that said reference point is established by the direction indicator means.

21. The apparatus of claim 19 wherein said successive displays are made at predetermined intervals of depth.

* * * * *